United States Patent [19]

Catozzi et al.

[11] Patent Number: 5,764,905
[45] Date of Patent: Jun. 9, 1998

[54] METHOD, SYSTEM AND COMPUTER PROGRAM PRODUCT FOR SYNCHRONIZING THE FLUSHING OF PARALLEL NODES DATABASE SEGMENTS THROUGH SHARED DISK TOKENS

[75] Inventors: John R. Catozzi, San Diego; Sorana Rabinovici, Woodland Hills, both of Calif.

[73] Assignee: NCR Corporation, Dayton, Ohio

[21] Appl. No.: 711,235

[22] Filed: Sep. 9, 1996

[51] Int. Cl.⁶ .................................. G06F 15/163
[52] U.S. Cl. ................. 395/200.45; 707/3; 707/10; 707/204; 395/200.31; 395/200.41; 711/173
[58] Field of Search ................... 707/204, 3, 10; 395/200.31, 200.41, 200.45; 711/173

[56] References Cited

U.S. PATENT DOCUMENTS

| | | | |
|---|---|---|---|
| 5,210,870 | 5/1993 | Baum et al. | 707/7 |
| 5,247,662 | 9/1993 | Minemura et al. | 707/2 |
| 5,555,404 | 9/1996 | Torbjornsen et al. | 395/200.08 |
| 5,640,584 | 6/1997 | Kandasamy et al. | 395/800.03 |
| 5,671,405 | 9/1997 | Wu et al. | 707/7 |
| 5,675,791 | 10/1997 | Bhide et al. | 707/205 |
| 5,687,369 | 11/1997 | Li | 707/203 |

Primary Examiner—Thomas G. Black
Assistant Examiner—Jean R. Homere
Attorney, Agent, or Firm—Merchant, Gould, Smith, Edell, Welter & Schmidt

[57] ABSTRACT

A processor method and apparatus for parallel computer systems for synchronizing the flushing of database segments by a node through shared disk tokens. The system provides for flushing database segments at each of the processor nodes through use of a persistent storage semaphore stored as a plurality of disk tokens and a set of control flags in a synchronization segment on a shared data storage device.

24 Claims, 4 Drawing Sheets

METHOD, SYSTEM AND COMPUTER PROGRAM PRODUCT FOR SYNCHRONIZING THE FLUSHING OF PARALLEL NODES DATABASE SEGMENTS THROUGH SHARED DISK TOKENS

CROSS-REFERENCE TO RELATED APPLICATIONS

This application is related to co-pending and commonly-assigned U.S. patent application Ser. No. 08/353,590, filed Dec. 12, 1994, by Kandasamy, et al., entitled "VIRTUAL PROCESSOR METHOD AND APPARATUS FOR ENHANCING PARALLELISM AND AVAILABILITY IN COMPUTER SYSTEMS", which application is incorporated by reference herein.

BACKGROUND OF THE INVENTION

1. Field of the Invention

The invention relates in general to client-server computer systems, and more particularly, to synchronizing the flushing of database segments by multiple processor nodes through the use of shared disk tokens.

2. Description of Related Art

Parallel computer systems are frequently comprised of arrays of individual computers (i.e., processor nodes), each with their own central processing units (CPUs), memory, and data storage unit. Tasks are executed in parallel by utilizing each processor node.

During the execution of a task, a body of work is divided into multiple threads. A thread is a stream of instructions executed by the computer on behalf of a task. As an analogy, a task such as an orchestra performing a symphony can be decomposed into many threads which would be the individual musicians, each playing their part.

Typically, in a parallel computer system, each thread is allocated to a different processor node. Each of these threads is then executed in parallel at their respective separate nodes. For instance, three threads can execute simultaneously on three different nodes at the same time.

One of the advantages of this parallel processing technique is accelerated execution times. For example, this technique provides performance improvements over the situation where one processor node executes a plurality of threads and the threads actually share or alternate slices of the processor node's total time. Nonetheless, regardless of the improvements provided by this technique, there is still a need to coordinate tasks which must execute at the same time on different processors.

SUMMARY OF THE INVENTION

To overcome the limitations in the prior art described above, and to overcome other limitations that will become apparent upon reading and understanding the present specification, the present invention discloses a method, apparatus, and article of manufacture for parallel computer systems for synchronizing the flushing of database segments by a node through shared disk tokens. The system provides for flushing database segments at each of the processor nodes through use of a persistent storage semaphore stored as a plurality of disk tokens and a set of control flags in a synchronization segment on a shared data storage device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention comprises a massively parallel processor (MPP) computer system that provides a backup processor node for each primary processor node, and a database segment flushing method for maintaining the integrity of the database managed by the computer system. Backup nodes are physically separate from their primary nodes so that a hardware failure in one node will not affect the other. If a primary or backup node fails, the present invention uses disk tokens stored in a shared area on disk to synchronize the writing of database segments from the primary and backup nodes to a shared data storage device.

ENVIRONMENT

Figure 1:
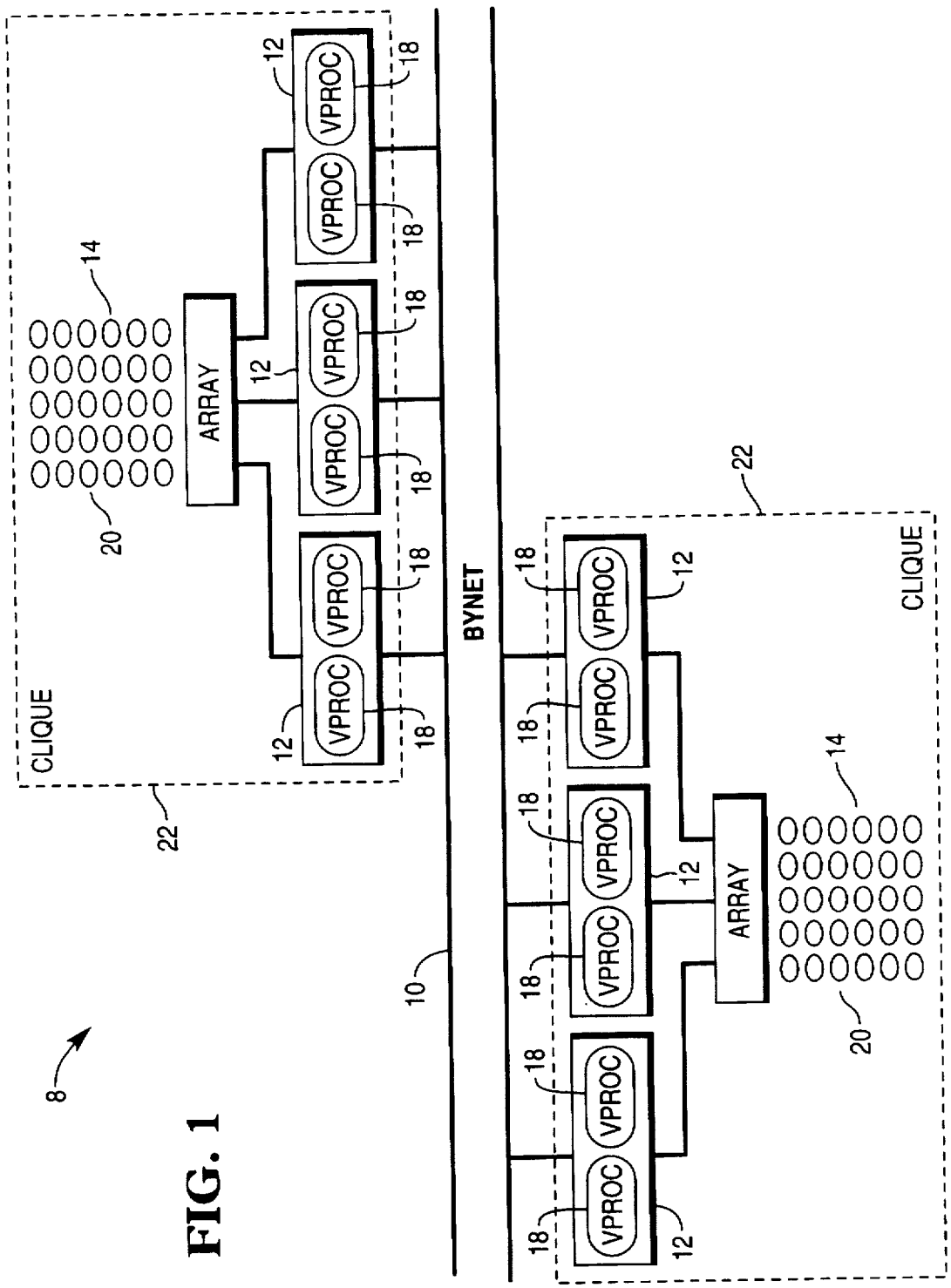
FIG. 1 is a block diagram that illustrates an exemplary computer hardware environment that could be used with the present invention.

FIG. 1 is a block diagram that illustrates an exemplary computer hardware environment that could be used with the present invention. In the exemplary computer hardware environment, a massively parallel processor (MPP) computer system 8 is illustrated. The MPP computer system 8 is comprised of one or more processor nodes 12 interconnected by a network 10. Each of the nodes 12 is typically a symmetric multi-processor (SMP) architecture and is comprised of a plurality of microprocessors, random access memory (RAM), read-only memory (ROM), and other components. It is envisioned that attached to each of the nodes 12 may be one or more fixed and/or removable data storage units (DSUs) 14, such as a redundant array of independent disks (RAID), that store one or more relational databases and other data. Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Each of the nodes 12 operates under the control of an operating system, such as the UNIX™ operating system. Further, each of the nodes 12 executes one or more computer programs under the control of the operating system. Generally, the operating system and the computer programs are tangibly embodied in and/or retrieved from RAM, ROM, and/or one or more other program storage or program communication devices. In the preferred embodiment, the operating system and the computer programs are tangibly embodied in one or more of the DSUs 14. Further, both the operating system and the computer programs are loaded from the DSUs 14 into RAM for execution by the node 12. In any embodiment, both the operating system and the computer programs comprise instructions which, when read and executed by the node 12, causes the node 12 to perform the steps necessary to execute the steps or elements of the present invention.

VIRTUAL PROCESSORS AND CLIQUES

The MPP computer system 8 of the present invention also includes logical constructs known as virtual processors (vprocs) and cliques. In the preferred embodiment of the present invention, a plurality of nodes 12 are arranged into cliques, wherein each of the nodes 12 executes one or more vprocs.

Figure 2:
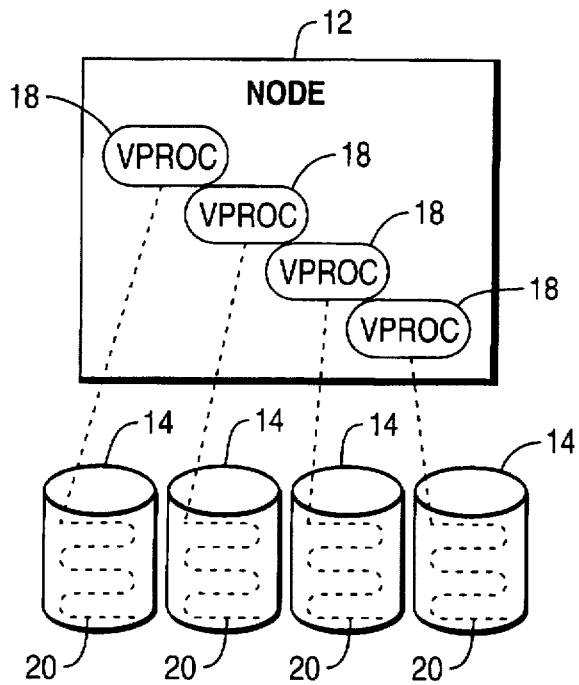
FIG. 2 is a block diagram that illustrates the concept of a virtual processor according to the present invention.

FIG. 2 is a block diagram that illustrates the concept of a virtual processor (vproc) 18 according to the present invention. In this example, a single node 12 has multiple DSUs 14 coupled thereto. When the node 12 has an SMP architecture, and thus comprises a plurality of microprocessors, it is preferable to provide for intra-node 12 as well as the inter-node 12 parallelism. The vproc 18 concept is accomplished by executing multiple instances or threads 16 in a node 12, wherein each such thread 16 is encapsulated within a vproc 18.

The vproc 18 concept adds a level of abstraction between the multi-threading of a work unit and the physical layout of the MPP computer system 8. Each vproc 18 is given its own private logical disk space, called a virtual disk (vdisk) 20. Each vdisk 20 may actually reside on one or more physical DSUs 14. Using the vproc 18 concept, there may be multiple concurrently executing threads 16 per node 12, so that, for example, there is one thread 16 per DSU 14 rather than one thread 16 per node 12.

The vproc 18 concept increases the degree of parallelism provided by the MPP computer system 8. As a result, the vproc 18 concept allows a "shared nothing" database to execute more efficiently on a MPP computer system 8 made up of SMP nodes 12. Further, the vproc 18 concept results in better system availability without undue programming overhead in the application.

Referring again to FIG. 1, a clique 22 is a collection of nodes 12 connected to one or more DSUs 14. As a result, vprocs 18 can access their associated vdisks 20 from any node 12 within the clique 22, thereby allowing a vproc 18 to run on any node 12 within the clique 22. The introduction of vprocs 18 and cliques 22 brings additional parallelism to the system 8 through the contributions of two factors: disk utilization and processor utilization.

With regard to disk utilization, if a node 12 has multiple DSUs 14 attached thereto, a single instance or thread 16 might utilize only one of those DSUs 14 at a time, leaving the other DSUs 14 underutilized or even idle. By using multiple vprocs 18 in a node 12, the degree of parallelism is increased to include up to one thread 16 per DSU 14, rather then one thread per node 12.

With regard to processor utilization, having multiple vprocs 18 per node 12 permits increased parallelism in a single query, since the query can be divided into multiple sub-queries performed by multiple threads 16 encapsulated by multiple vprocs 18 on multiple nodes 12. The ability to perform multiple subqueries in multiple vprocs 18 executed by multiple microprocessors in a single SMP node 12 better harnesses the total processing power of the MPP computer system 8.

The introduction of vprocs 18 and cliques 22 also brings increased availability to the system 8. It can be shown that the likelihood of a least one of the nodes 12 in the clique 22 being functional is orders of magnitude higher than the likelihood of any one node 12 being functional.

DATABASE SEGMENTS FLUSH

In the preferred embodiment of the present invention, each node 12 may execute a plurality of different threads 16, for example, via vprocs 18. Each of these threads 16 may frequently map and unmap database segments retrieved from the DSUs 14. These database segments are sometimes heavily shared among threads 16 and/or nodes 12. However, under normal operation, each node 12 is assigned semi-exclusive use of one or more database segments residing on the DSUs 14. In such situations, fault tolerance techniques are used to ensure recovery from any failure of a node 12 and access to the database segments assigned to the node 12.

The fault tolerance technique used in the present invention comprises the step by pairing a "primary" node 12 of a clique 22 with a different "backup" node 12 of the clique 22 for fault tolerance purposes. The primary node 12 stores one or more database segments from the DSUs 14 and performs the necessary functions or steps associated with a particular thread 16 using the stored database segments. Periodically, the primary node 12 checkpoints its context to its associated backup node 12, wherein its context includes the current copy of the database segments stored in the primary node 12.

Should the primary node 12 fail for some reason, then the backup node 12 takes over the steps of storing the database segments and performing the necessary functions associated with the particular thread 16. However, the backup node 12 must ensure the integrity of the database segments stored on the DSUs 14. More specifically, the backup node 12 must ensure that write operations to the DSUs 14 for the database segments have been correctly synchronized.

The present invention synchronizes the "flushing" of database segments to the DSUs 14, by a primary node 12 or backup node 12, through the use of shared disk tokens. A backup node 12 is in the same clique 22 as a primary node 12. The backup node 12 receives and maintains a copy of the database segments modified by the primary node 12. This allows the use of low-latency network 10 I/O operations to implement a write cache, thereby eliminating the performance penalty of much slower DSU 14 I/O operations when checkpointing updates to the database segments.

The integrity of the database segments must be assured, and for this reason, either the primary node 12 or the backup node 12, but not both, have to flush their modified database segments to the DSUs 14. In most cases, it is preferable to flush the database segments stored in the primary node 12, because it has the most recent data. However, when an exceptional condition occurs, such as the failure of a primary node 12, it may be necessary to flush the database segments stored in the backup node 12.

To ensure that only one node 12 (either the primary node 12 or the backup node 12) flushes its database segments, the present invention provides shared disk tokens as persistent storage semaphores, wherein a set of flags control the operations on the shared disk tokens. Further, a synchronization segment is preferably defined on the shared DSU 14 to provide storage locations for the shared disk tokens.

Figure 3:
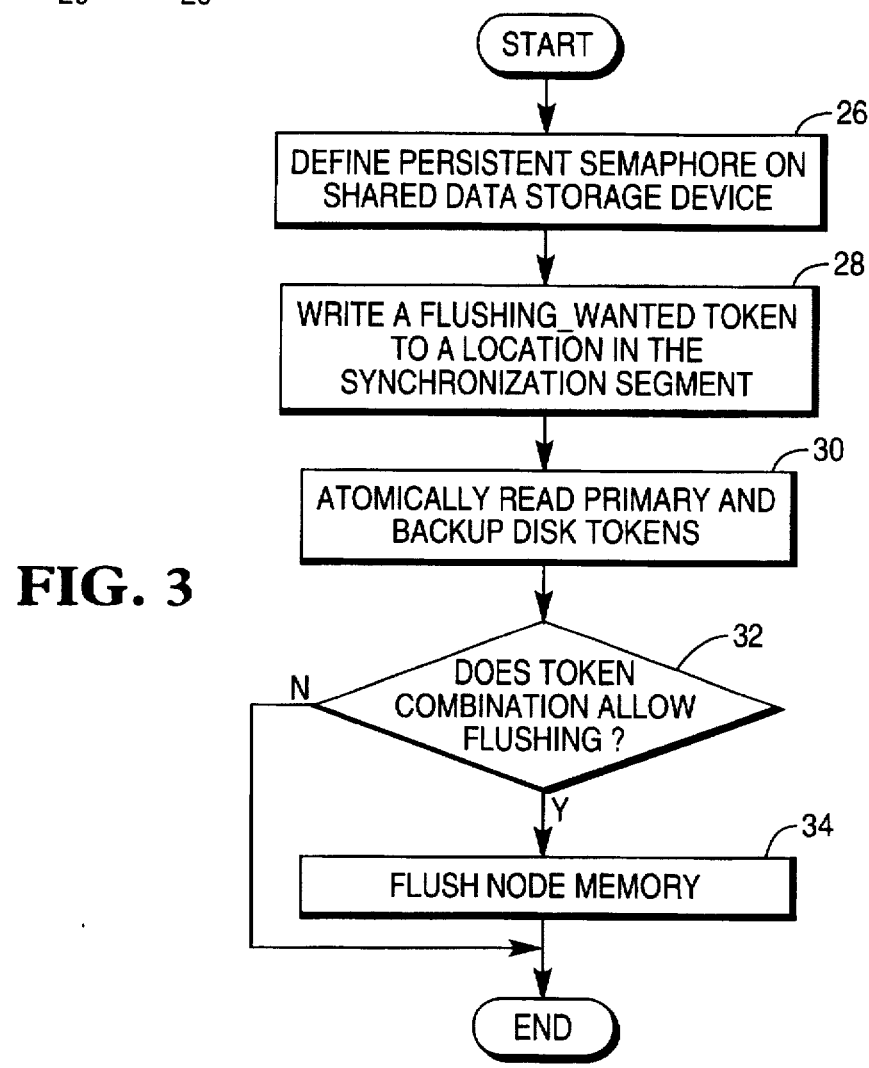
FIG. 3 is a flowchart diagram that illustrates the use of the shared disk tokens by the primary node and the backup node according to the present invention.

FIG. 3 is a flow chart diagram that illustrates the use of shared disk tokens by the primary node 12 and the backup node 12 according to the present invention.

Each of the disk tokens has one of four values: FLUSHING_INIT (I), FLUSHING_REQUEST (R), FLUSHING_IN_PROGRESS (P), and FLUSHING_DONE (D). At initialization, each disk token has the value (I) for FLUSHING_INIT. As modifications are made to the database segments by the primary node 12, and communicated to the backup node 12. On the occurrence of an event, each disk token is set to the value (R) for FLUSHING_REQUEST. When the modified database segments are flushed to the DSUs 14, each disk token is set to the value (P) for FLUSHING_INPROGRESS. Finally, once the modified database segments have been stored on the DSUs 14, each disk token is set to the value (D) for FLUSHING_DONE.

Block 26 represents either a primary or backup node 12 writing its shared disk token to the synchronization segment on the DSU 14, wherein the primary and backup disk tokens are stored in two different areas of the synchronization segment by the primary and backup nodes 12, respectively. Block 30 represents the node 12 atomically reading both its disk token and the disk token of the associated primary or backup node 12 from the synchronization segment on the DSU 14. Block 32 is a decision block that represents the node 12 examining the shared disk tokens read from the synchronization segment on the DSU 14 to determine whether it should flush its database segments. Block 34 represents the node 12 flushing its database segments to the DSU 14 based on the results of the comparison. Otherwise, the node 12 does not flush its database segments to the DSU 14 based on the results of the comparison.

This process insures that the database segments will be stored in a valid state on the DSU 14, so long as either or both the primary node 12 and the backup node 12 remain functioning. Following the flush of the database segments to the DSU 14, the vprocs formerly assigned to the failed node 12 can be assigned to another node 12 that shares access to the associated DSU 14, with the assurance that the database segments are in the correct state.

Figure 4:
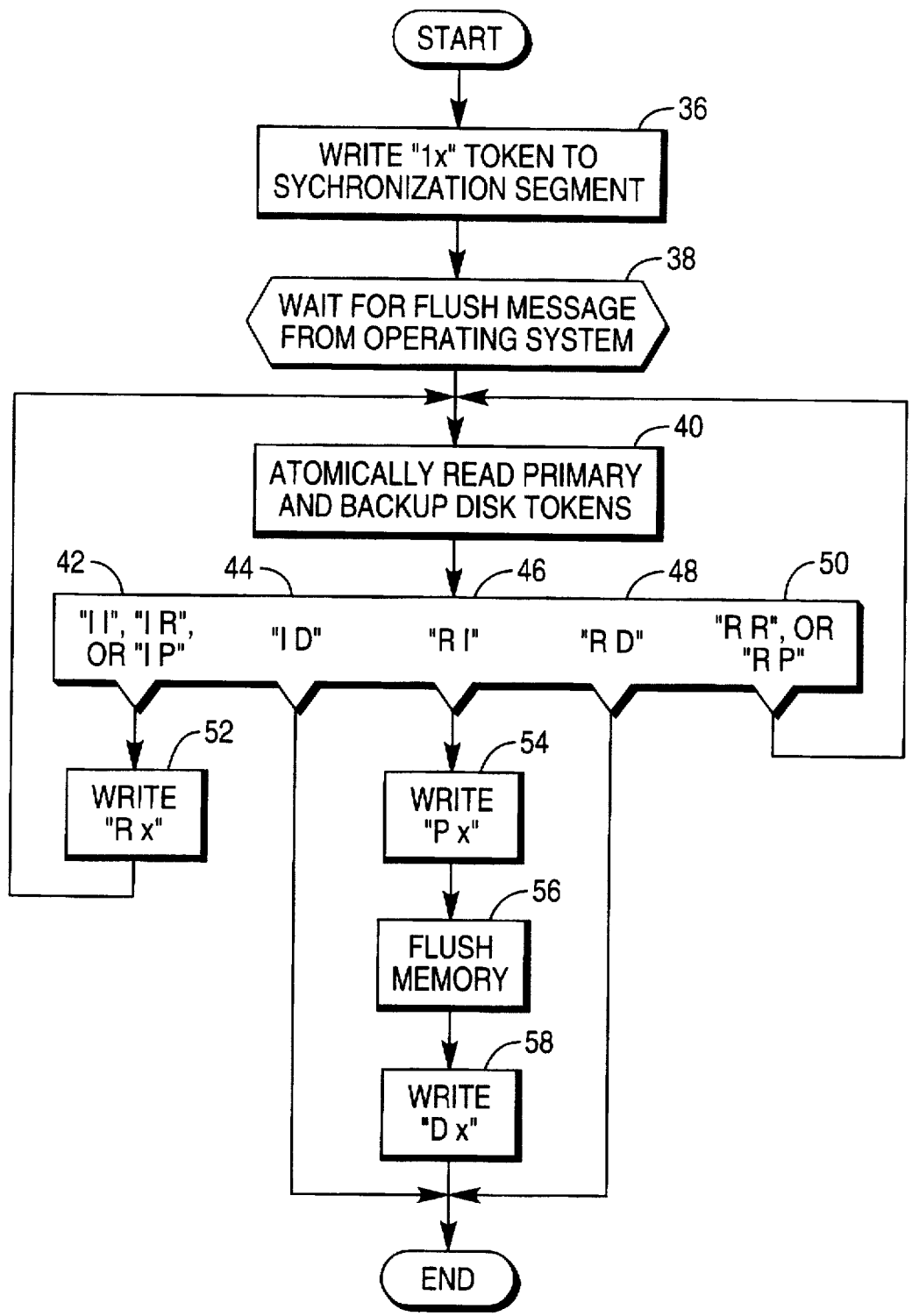
FIG. 4 is a flow chart diagram that further illustrates the shared disk tokens and corresponding actions taken by a primary node according to the present invention.

FIG. 4 is a flow chart diagram that further illustrates the shared disk tokens and corresponding actions taken by a primary node 12 according to the present invention.

Block 36 represents an initialization step during which the primary node 12 writes its initial condition "I x" into the shared disk tokens in the synchronization segment, wherein "I" is used to denote the value "I" is written for the primary disk token and "x" is used to denote that the value of the backup disk token is not modified.

Block 38 represents the primary node 12 performing normal tasks and also waiting for a message from the operating system (or a controlling computer program or other entity) indicating that a database segment flush should be performed. Because each node 12 acts as both a primary node 12 and a backup node 12 for different database segments, the node 12 first flushes the database segments for which it is a "primary" node 12 before flushing the database segments for which it is the "backup" node 12.

Block 40 represents the primary node 12 atomically reading both its disk token and the disk token of the associated backup node 12. Blocks 42 through 50 represent decision blocks based upon the value of the primary and backup disk tokens read from the shared DSU 14. If, at block 42, the disk tokens are either "I I", "I R", or "I P", then the primary node 12 writes a "request" token "R x" at block 52, even though the backup node 12 may have already started its flush procedure, and then control returns to block 40. The primary node writes this request token, because it still has priority over the backup node 12 at this point. If the backup node 12 has started its flush process, but has not actually started writing its database segments to the DSU 14, it will terminate its process and update its disk token to allow the primary node 12 to perform its flush process instead. If, at block 44, the shared disk tokens are "I D", then no flush is required, because the backup node 12 has already completed its flush process, and therefore the primary node 12 flush process simply terminates. If, at block 46, the shared disk tokens are "R I", then the primary node 12 writes an "in progress" token "P x" at block 54, flushes its database segments to the DSU 14 at block 56, and writes a "done" token "D x" at block 58. If, at block 48, the shared disk tokens are "R D", then no flush process is required, because the backup node 12 has already completed its flush process, and therefore the primary node 12 flush process terminates. If, at block 50, the shared disk tokens are either "R R" or "R P", then no action can yet be taken and the primary node 12 returns control to block 40. The shared disk tokens reflect the priority the primary node 12 has over the backup node 12, and therefore the primary node 12 will flush its database segments before the backup node 12, unless the backup node 12 has started its flush process, as indicated by the "P" value in the backup disk token, and has actually started writing its database segments to the DSU 14.

Figure 5:
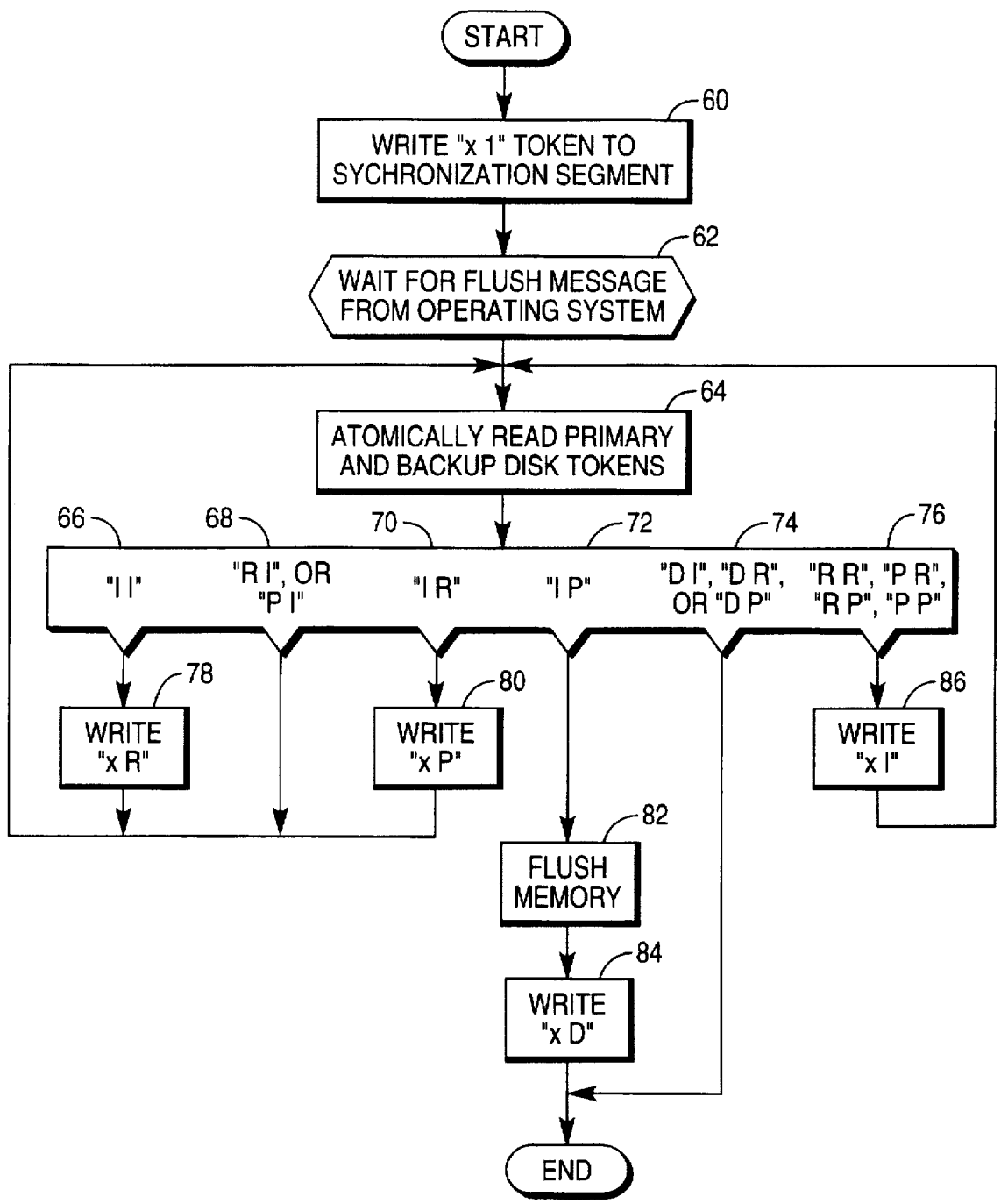
FIG. 5 is a flow chart diagram that further illustrates the shared disk tokens and corresponding actions taken by a backup node according to the present invention.

FIG. 5 is a flow chart diagram that further illustrates the shared disk tokens and corresponding actions taken by a backup node 12 according to the present invention. Block 60 represents an initialization step during which the backup node 12 writes its initial condition "x I" into the shared disk tokens in the synchronization segment. Block 62 represents the backup node 12 performing normal tasks and also waiting for a message from the operating system (or other controlling computer program or entity) indicating that a database segment flush should be performed. Because each node 12 acts as both a primary node 12 and a backup node 12 for different database segments, the node 12 first flushes the database segments for which it is a "primary" node 12 before flushing the database segments for which it is the "backup" node 12.

Block 64 represents the backup node 12 atomically reading both its disk token and the disk token of the associated primary node 12. Blocks 66 through 76 represent decision blocks based upon the value of the primary and backup disk tokens read from the shared DSU 14. If, at block 66, the shared disk tokens are "I I", then the backup node 12 writes a "request" token "x R" at block 78, and control returns to block 64. If, at block 68, the shared disk tokens are either "R I" or "P I", then no action can yet be taken and the backup node 12 returns control to block 64. If, at block 70, the shared disk tokens are "I R", then the backup node 12 writes an "in progress" token "x P" at block 80, and returns control to block 64. This allows the backup node 12 to be preempted by the primary node 12, even though the backup node 12 has started its flush process, but has not yet started flushing its database segments to the DSU 14. If, at block 72, the shared disk tokens are "I P", then the backup node 12 flushes its database segments to the DSU 14 at block 82, and writes a "done" token "x D" at block 84. If, at block 74, the shared disk tokens are either "D I", "D R", or "D P", then no flush is required, because the primary node 12 has already completed its flush, and therefore the backup node 12 flush process simply terminates. If, at block 76, the shared disk tokens are either "R R", "P R", "R P", or "P P", the backup node 12 recognizes that the primary node 12 is attempting to flush its database segments, and therefore, because the primary node 12 has priority, the backup node 12 rewrites its initialization token "x I" at block 86 and then returns control to block 64.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of flushing database segments in a computer system having a plurality of processor nodes, the method comprising the steps of:
   (a) accessing one or more database segments from a data storage device attached to the computer system, modifying the accessed database segments, and storing a copy of the modified database segments in both a primary node and a backup node;
   (b) defining a persistent storage semaphore for the database segments on the data storage device, wherein the persistent storage semaphore is accessible by both the primary and backup nodes;
   (c) modifying the persistent storage semaphore for the database segments on the data storage device to indicate a flush status of both the primary and backup nodes; and
   (d) selectively flushing the database segments from either the primary node or the backup node to the data storage device based on the flush status indicated in the persistent storage semaphore.

2. The method as recited in claim 1, wherein the step of selectively flushing comprises the step of selectively flushing the database segments from the primary node when the persistent storage semaphore indicates that the backup node has not yet started flushing the database segments.

3. The method as recited in claim 1, wherein the step of selectively flushing comprises the step of selectively flushing the database segments from the backup node when the persistent storage semaphore indicates that the primary node has not yet started it s flush procedure.

4. The method as recited in claim 1, wherein the step of selectively flushing comprises the step of selectively flushing the database segments from either the primary node or the backup node to the data storage device in response to a received flush command.

5. The method as recited in claim 1, wherein the persistent storage semaphore indicates an initialization of a flush.

6. The method as recited in claim 1, wherein the persistent storage semaphore indicates a request for a flush.

7. The method as recited in claim 1, wherein the persistent storage semaphore indicates a flush is in progress.

8. The method as recited in claim 1, wherein the persistent storage semaphore indicates a flush has completed.

9. A computer system, comprising:
   (a) a plurality of nodes and a data storage device coupled to the computer system;
   (b) access means coupled to the data storage device for accessing one or more database segments from a data storage device attached to the computer system, for modifying the accessed database segments, and for storing a copy of the modified database segments in both a primary node and a backup node;;
   (c) definition means coupled to the data storage device for defining a persistent storage semaphore for the database segments on the data storage device, wherein the persistent storage semaphore is accessible by both the primary and backup nodes;
   (d) modification means coupled to the data storage device for modifying the persistent storage semaphore for the database segments on the data storage device to indicate a flush status of both the primary and backup nodes; and
   (e) flush means coupled to the plurality of nodes and the data storage device for selectively flushing the database segments from either the primary node or the backup node to the data storage device based on the flush status indicated in the persistent storage semaphore.

10. The computer system as recited in claim 9, wherein the flush means comprises means for selectively flushing the database segments from the primary node when the persistent storage semaphore indicates that the backup node has not yet started flushing the database segments.

11. The computer system as recited in claim 9, wherein the flush means comprises means for selectively flushing the database segments from the backup node when the persistent storage semaphore indicates that the primary node has not yet started its flush procedure.

12. The computer system as recited in claim 9, wherein the flush means comprises means for selectively flushing the database segments from either the primary node or the backup node to the data storage device in response to a received flush command.

13. The computer system as recited in claim 9, wherein the persistent storage semaphore indicates an initialization of a flush.

14. The computer system as recited in claim 9, wherein the persistent storage semaphore indicates a request for a flush.

15. The computer system as recited in claim 9, wherein the persistent storage semaphore indicates a flush is in progress.

16. The computer system as recited in claim 9, wherein the persistent storage semaphore indicates a flush has completed.

17. One or more program storage devices readable by a computer having a memory and coupled to a data storage device, each of the program storage devices tangibly embodying one or more programs of instructions executable by a computer to perform method steps for flushing database segments in a computer system having a plurality of processor nodes, the method comprising the steps of:
   (a) accessing one or more database segments from a data storage device attached to the computer system, modifying the accessed database segments, and storing a copy of the modified database segments in both a primary node and a backup node;
   (b) defining a persistent storage semaphore for the database segments on the data storage device, wherein the persistent storage semaphore is accessible by both the primary and backup nodes;
   (c) modifying the persistent storage semaphore for the database segments on the data storage device to indicate a flush status of both the primary and backup nodes; and (d) selectively flushing the database segments from either the primary node or the backup node to the data storage device based on the flush status indicated in the persistent storage semaphore.

18. The one or more program storage devices as recited in claim 17, wherein the step of selectively flushing comprises the step of selectively flushing the database segments from the primary node when the persistent storage semaphore indicates that the backup node has not yet started flushing the database segments.

19. The one or more program storage devices as recited in claim 17, wherein the step of selectively flushing comprises the step of selectively flushing the database segments from the backup node when the persistent storage semaphore indicates that the primary node has not yet started its flush procedure.

20. The one or more program storage devices as recited in claim 17, wherein the step of selectively flushing comprises the step of selectively flushing the database segments from either the primary node or the backup node to the data storage device in response to a received flush command.

21. The one or more program storage devices as recited in claim 17, wherein the persistent storage semaphore indicates an initialization of a flush.

22. The one or more program storage devices as recited in claim 17, wherein the persistent storage semaphore indicates a request for a flush.

23. The one or more program storage devices as recited in claim 17, wherein the persistent storage semaphore indicates a flush is in progress.

24. The one or more program storage devices as recited in claim 17, wherein the persistent storage semaphore indicates a flush has completed.

* * * * *